(12) United States Patent
Franca et al.

(10) Patent No.: US 10,668,670 B2
(45) Date of Patent: Jun. 2, 2020

(54) PROCESS FOR SEALING FLEXIBLE FITMENT TO FLEXIBLE FILM

(71) Applicant: Dow Global Technologies LLC, Midland, MI (US)

(72) Inventors: Marcos Pini Franca, Sao Paulo (BR); Bruno Rufato Pereira, Sao Paulo (BR); Raimund Gerstner, Bucaramanga (CO); Liangkai Ma, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 971 days.

(21) Appl. No.: 14/928,572

(22) Filed: Oct. 30, 2015

(65) Prior Publication Data

US 2017/0120552 A1 May 4, 2017

(51) Int. Cl.
*B29C 65/00* (2006.01)
*B29C 65/18* (2006.01)
(Continued)

(52) U.S. Cl.
CPC ............ *B29C 66/133* (2013.01); *B29C 65/18* (2013.01); *B29C 66/004* (2013.01); *B29C 66/1122* (2013.01); *B29C 66/326* (2013.01); *B29C 66/53262* (2013.01); *B29C 66/53263* (2013.01); *B29C 66/71* (2013.01); *B29C 66/723* (2013.01); *B29C 66/73115* (2013.01); *B29C 66/81431* (2013.01); *B29C 66/83221* (2013.01);
(Continued)

(58) Field of Classification Search
CPC .. B31B 1/84; B31B 2219/9054; B29C 66/133
USPC .......................................... 493/189, 87, 213
See application file for complete search history.

(56) References Cited

U.S. PATENT DOCUMENTS 3,915,600 A * 10/1975 Lamm ..................... F01C 19/04
418/122
4,225,553 A * 9/1980 Hirota .................... B21D 22/22
264/292

(Continued)

FOREIGN PATENT DOCUMENTS

| EP | 0661208 A1 | 7/1995 |
|---|---|---|
| WO | 98/00286 A1 | 1/1998 |
| WO | 00/43189 A1 | 7/2000 |

*Primary Examiner* — Sameh Tawfik
(74) *Attorney, Agent, or Firm* — Quarles & Brady LLP

(57) ABSTRACT

The present disclosure provides a process. In an embodiment, the process includes (A) providing a fitment with a base having a wall thickness ($T_w$). The base comprises an ethylene/a olefin multi-block copolymer. The process includes (B) placing the base between two opposing multilayer films. Each multilayer film has a respective seal layer comprising an olefin-based polymer. The process includes (C) positioning the base and opposing multilayer films between opposing seal bars. Each seal bar comprises (i) a front surface, (ii) a recessed surface a distance (x) behind the front surface, the recessed surface having a first end and an opposing second end. Each seal bar comprises (iii) a curved surface at each opposing end. The curved surface extends between the front surface and the recessed surface. Each curved surface has a radius of curvature (Rc) greater than or equal to distance (x). The process includes (D) heat sealing the base to each multilayer film.

15 Claims, 6 Drawing Sheets

(51) Int. Cl.
  B31B 50/84 (2017.01)
  B29K 96/04 (2006.01)
  B29L 31/00 (2006.01)
  B31B 70/84 (2017.01)

(52) U.S. Cl.
  CPC .. B29C 66/91411 (2013.01); B29C 66/91921 (2013.01); B31B 50/84 (2017.08); B29C 66/242 (2013.01); B29C 66/73116 (2013.01); B29C 66/919 (2013.01); B29C 66/929 (2013.01); B29C 66/949 (2013.01); B29K 2096/04 (2013.01); B29L 2031/7148 (2013.01); B31B 70/844 (2017.08)

(56) References Cited

U.S. PATENT DOCUMENTS

| | | | | |
|---|---|---|---|---|
| 4,437,822 A | * | 3/1984 | Schwartz | F01C 19/04 418/122 |
| 4,650,452 A | * | 3/1987 | Jensen | A61J 1/10 222/107 |
| 5,002,623 A | * | 3/1991 | Steer | A61F 5/4404 156/221 |
| 5,088,640 A | * | 2/1992 | Littlejohn | A47G 19/03 220/574 |
| 5,484,375 A | * | 1/1996 | Owensby | B29C 65/18 493/190 |
| 5,783,638 A | * | 7/1998 | Lai | B29C 47/0004 525/240 |
| 5,855,544 A | * | 1/1999 | Buchanan | B29C 65/18 493/102 |
| 6,474,497 B1 | * | 11/2002 | Littlejohn | A47G 19/03 206/519 |
| 6,958,033 B1 | * | 10/2005 | Malin | B29C 65/18 493/102 |
| 7,608,668 B2 | | 10/2009 | Li Pi Shan et al. | |
| 7,858,706 B2 | | 12/2010 | Arriola et al. | |
| 7,893,166 B2 | | 2/2011 | Shan et al. | |
| 7,947,793 B2 | * | 5/2011 | Marchand | C08F 297/083 359/586 |
| 8,734,309 B2 | * | 5/2014 | Johns | B31B 43/00 493/152 |
| 9,688,803 B2 | * | 6/2017 | McLennaghan | C08F 297/083 |
| 9,701,456 B2 | * | 7/2017 | Franca | B65D 31/04 |
| 9,752,024 B2 | * | 9/2017 | Barry | C08L 23/12 |
| 2005/0159284 A1 | * | 7/2005 | Smith | B31B 70/00 493/143 |

* cited by examiner

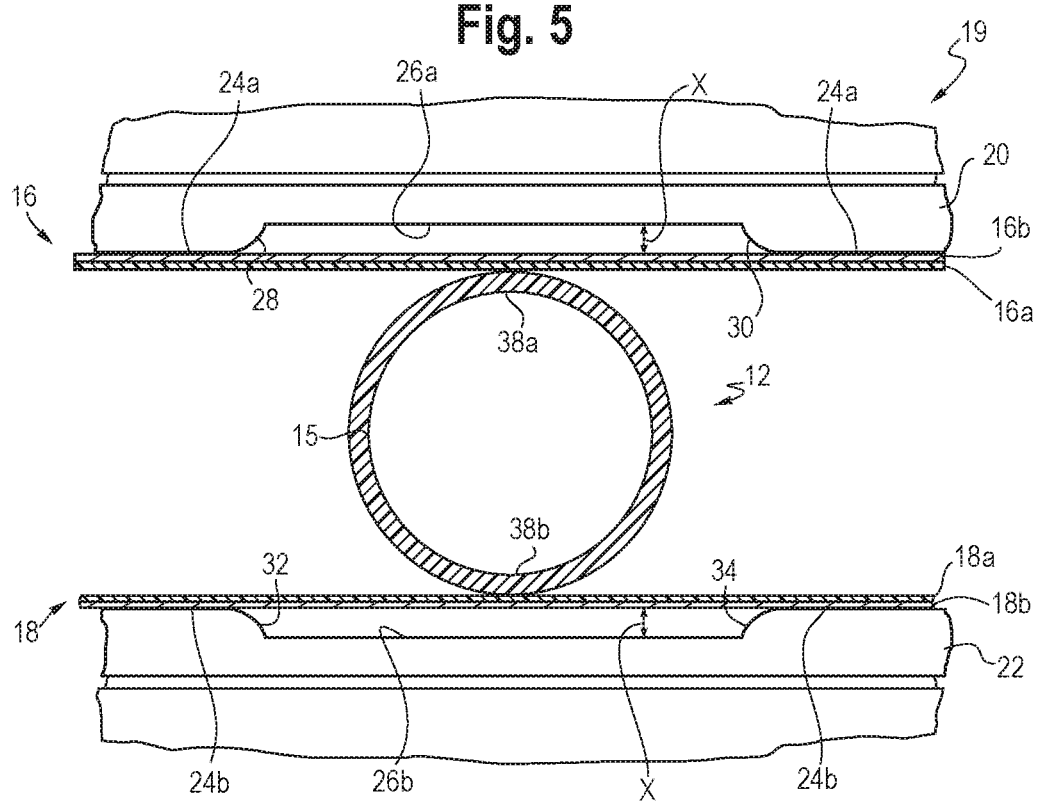
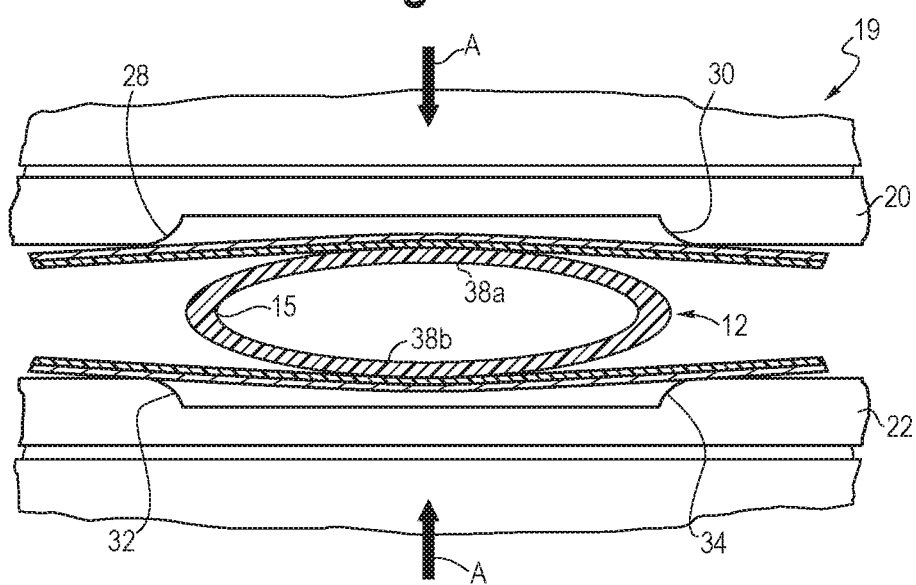

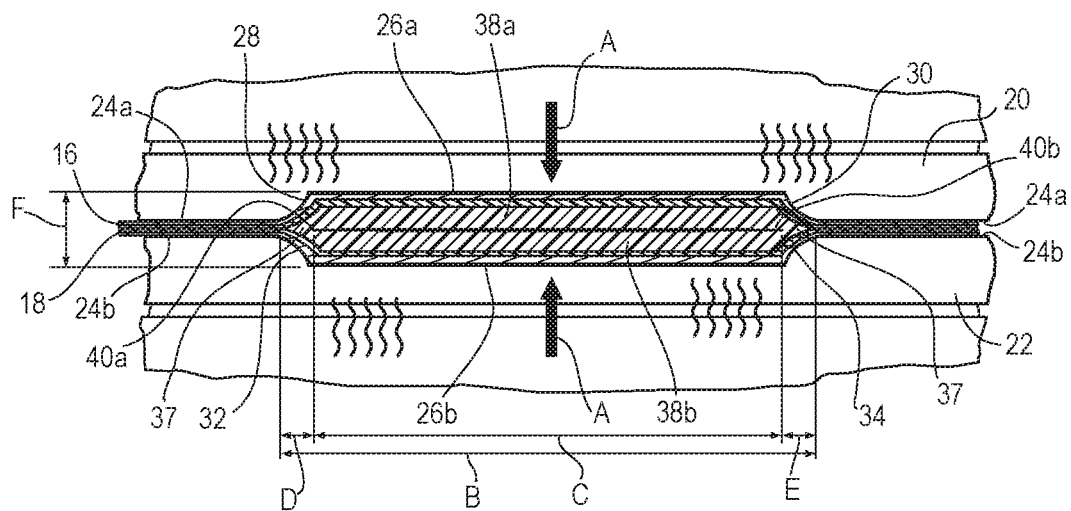
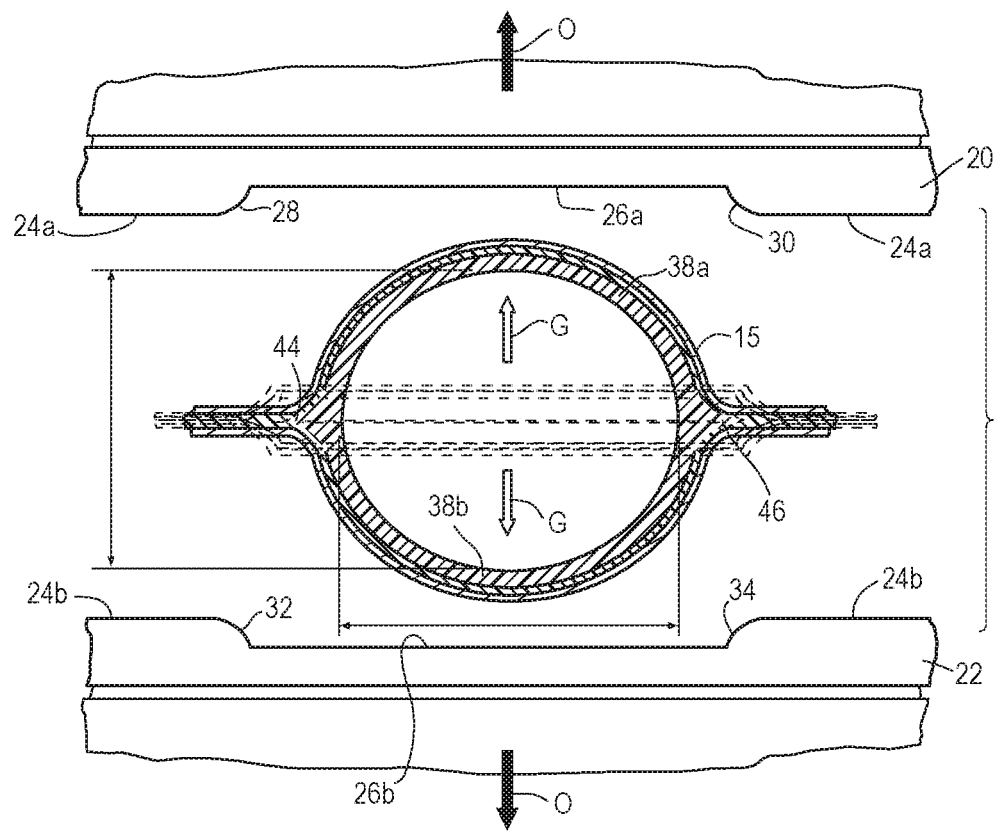

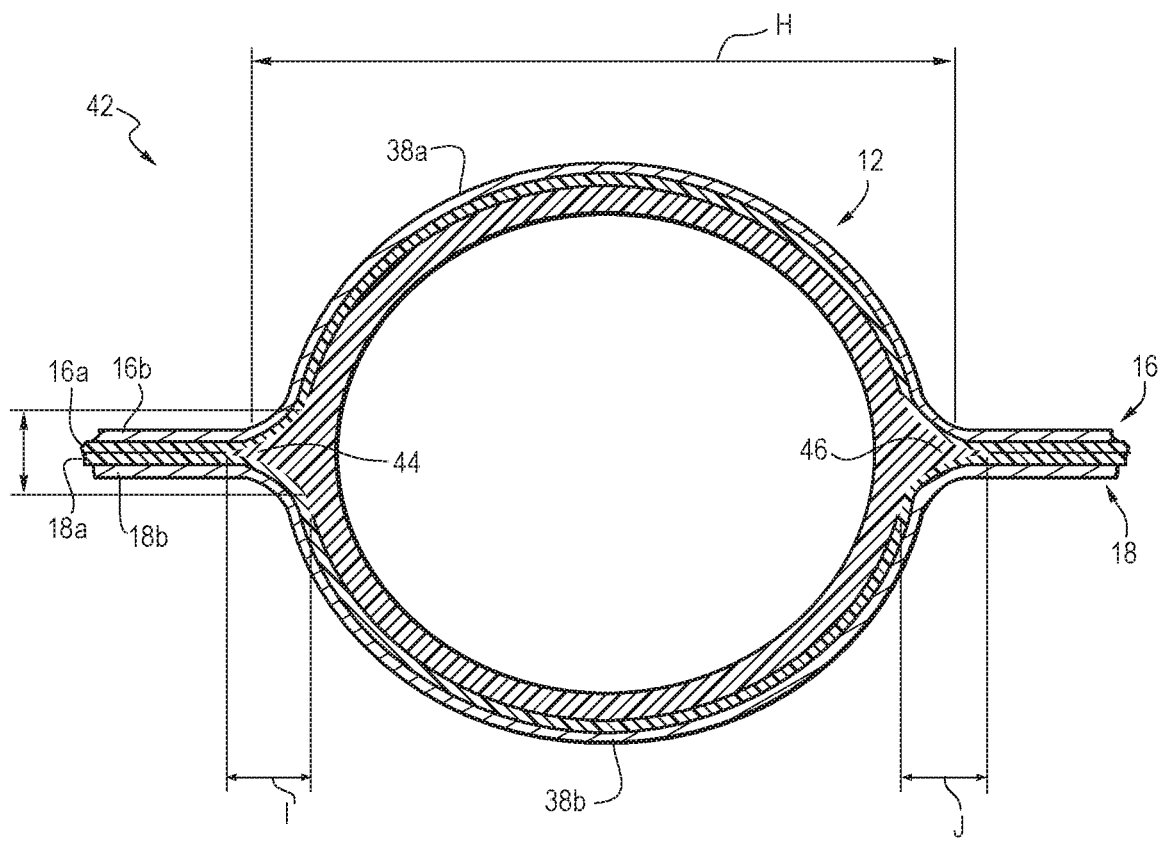

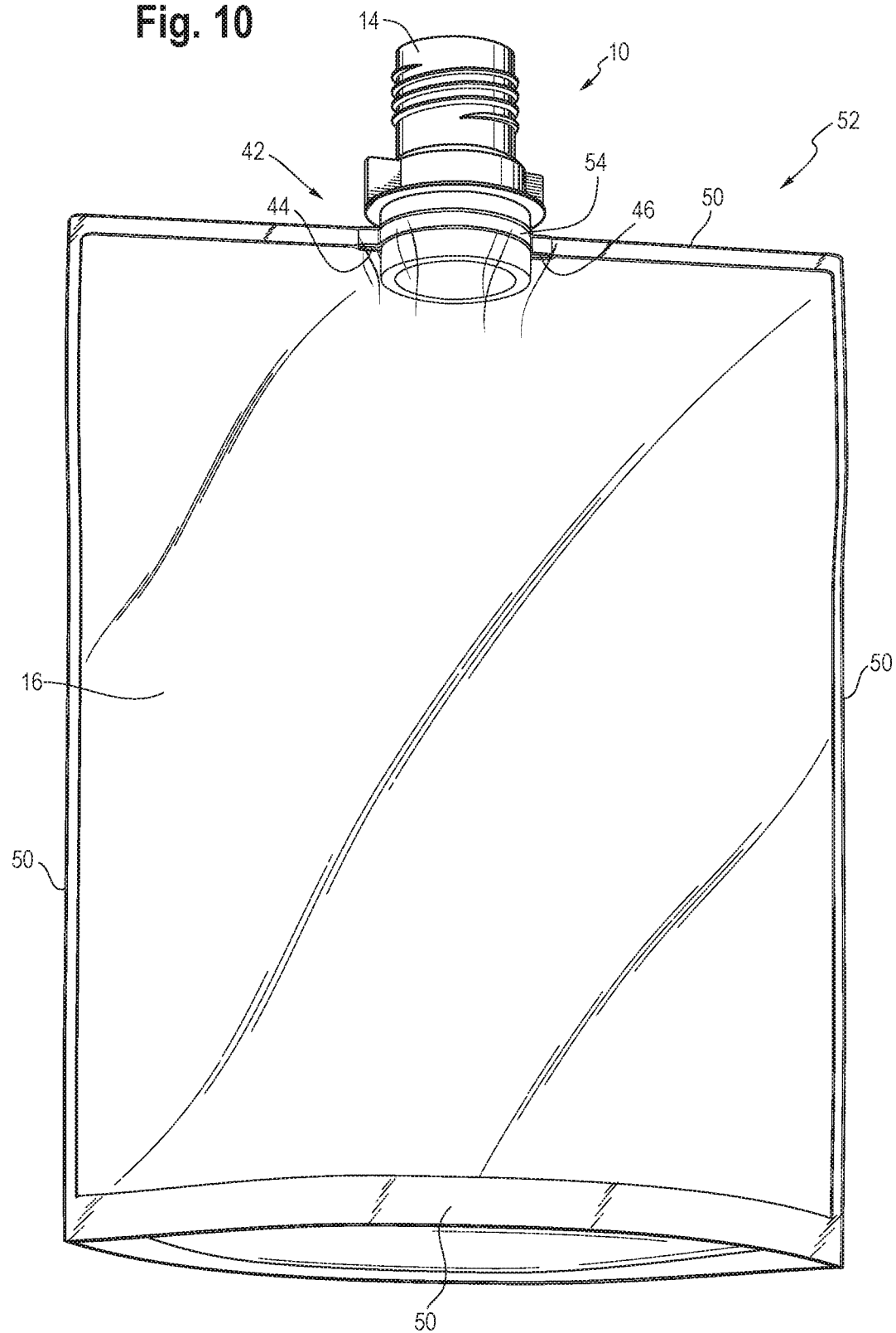

PROCESS FOR SEALING FLEXIBLE FITMENT TO FLEXIBLE FILM

The present disclosure is directed to a process for sealing a flexible fitment between two flexible films.

Known are flexible pouches with rigid pour spouts for storage and delivery of flowable materials, often referred to as "pour-pouches." Many conventional pour-pouches utilize a rigid pour spout, with the base of the spout having winglets. Each winglet is a structure that is perpendicular to the base, each winglet extends radially away (in opposing directions) from the annular base of the spout. Winglets are used to increase the surface area of the annular base in order to promote adhesion between the spout and flexible packaging film.

Winglets, however, are problematic because they require a specialized heat seal bar to effectively seal the winglet to flexible film packaging. The specialized heat seal bar requires a unique shape that mates with the shape of the spout base and winglet. In addition, the heat seal process requires precise and mated alignment between the spout and the films to ensure the spout is in parallel alignment with the film orientation.

As such, the production of flexible pouches is replete with inefficiency due to (1) the expense of specialized heat seal equipment, (2) the production down-time for precise seal bar-winglet alignment, (3) the production down-time required for precise spout-film alignment, (4) the failure rate (leaks) due to misalignment, and (5) the quality control steps required at each stage of pour-pouch production.

The art recognizes the need for alternative processes in the production of pour-pouches. The art further recognizes the need for improved pour spouts that avoid the production drawbacks of spouts having winglets.

SUMMARY

The present disclosure provides an improved fitment and concomitant improved fitment seal for pour-pouches. The present fitment reduces the amount of materials used to produce the fitment itself and also simplifies the pour-pouch production process.

The present disclosure provides a process. In an embodiment, the process includes (A) providing a fitment with a base having a wall thickness ($T_w$). The base comprises an ethylene/α-olefin multi-block copolymer. The process includes (B) placing the base between two opposing multilayer films. Each multilayer film has a respective seal layer comprising an olefin-based polymer. The process includes (C) positioning the base and opposing multilayer films between opposing seal bars. Each seal bar comprises (i) a front surface, (ii) a recessed surface a distance (x) behind the front surface, the recessed surface having a first end and an opposing second end. Each seal bar comprises (iii) a curved surface at each opposing end. The curved surface extends between the front surface and the recessed surface. Each curved surface has a radius of curvature (Rc) greater than or equal to distance (x). The process includes (D) heat sealing the base to each multilayer film.

An advantage of the present disclosure is a fitment formed from ethylene/α-olefin multi-block copolymer, enabling thin-wall base.

An advantage of the present disclosure is a fitment formed from ethylene/α-olefin multi-block copolymer providing the base with sufficient integrity to survive compression during heat seal and the sufficient resiliency to spring back to an open position post-heat seal.

An advantage of the present disclosure is a pour-pouch production process that does not require precise seal bar-winglet alignment for heat sealing.

An advantage of the present disclosure is a fitment for pour-pouches that utilizes less polymeric material than the amount of polymeric material used in conventional winglet bases for rigid pour spouts.

An advantage of the present disclosure is a pour-pouch production process that requires less time (greater efficiency) and fewer failures (higher productivity) compared to pour-pouch production processes utilizing spouts with winglets.

An advantage of the present disclosure is a flexible fitment with resiliency to spring back to an open position after full collapse during heat seal, the fitment made from ethylene/α-olefin multi-block copolymer that is compatible with seal layer polyolefins.

BRIEF DESCRIPTION OF THE DRAWINGS

FIG. 5 is an elevation view of a fitment and opposing multilayer films positioned between opposing seal bars in accordance with an embodiment of the present disclosure.

FIG. 6 is an elevation view of a heat sealing process in accordance with an embodiment of the present disclosure.

FIG. 7 is an elevation view of fully closed seal bars in a heat sealing process in accordance with an embodiment of the present disclosure.

FIG. 8 is an elevation view of the opening of seal bars in the heat seal process in accordance with an embodiment of the present disclosure.

FIG. 9 is an elevation view of a welded component having in situ winglets in accordance with an embodiment of the present disclosure.

FIG. 10 is a perspective view of a flexible container in accordance with an embodiment of the present disclosure.

DEFINITIONS

Figure 1:
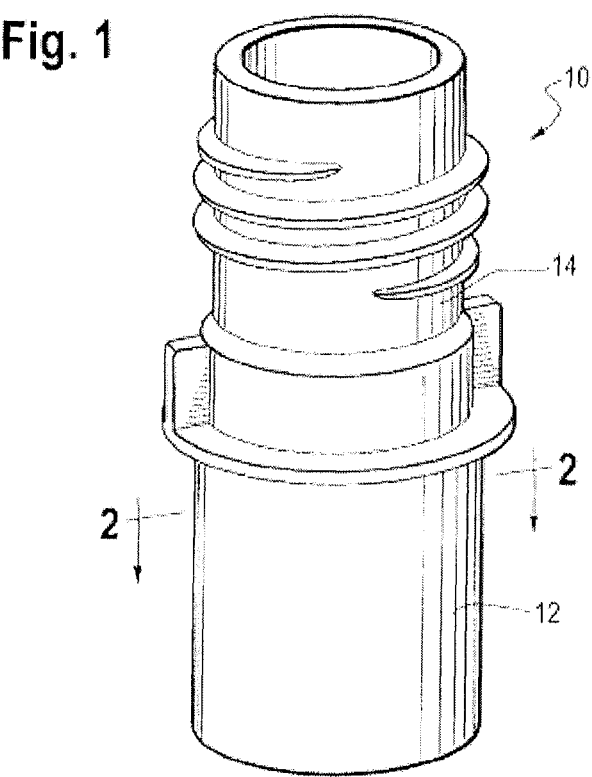
FIG. 1 is a perspective view of a fitment in accordance with an embodiment of the present disclosure.

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

The numerical ranges disclosed herein include all values from, and including the lower value and the upper value. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight, and all test methods are current as of the filing date of this disclosure.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Density is measured in accordance with ASTM D 792.

Elastic recovery is measured as follows. Stress-strain behavior in uniaxial tension is measured using an Instron™ universal testing machine at 300% min$^{-1}$ deformation rate at 21° C. The 300% elastic recovery is determined from a loading followed by unloading cycle to 300% strain, using ASTM D 1708 microtensile specimens. Percent recovery for all experiments is calculated after the unloading cycle using the strain at which the load returned to the base line. The percent recovery is defined as:

% Recovery=100*($Ef$–$Es$)/$Ef$ where Ef is the strain taken for cyclic loading and Es is the strain where the load returns to the baseline after the unloading cycle.

An "ethylene-based polymer," as used herein is a polymer that contains more than 50 mole percent polymerized ethylene monomer (based on the total amount of polymerizable monomers) and, optionally, may contain at least one comonomer.

Melt flow rate (MFR) is measured in accordance with ASTM D 1238, Condition 280° C./2.16 kg (g/10 minutes).

Melt index (MI) is measured in accordance with ASTM D 1238, Condition 190° C./2.16 kg (g/10 minutes).

Shore A hardness is measured in accordance with ASTM D 2240.

Tm or "melting point" as used herein (also referred to as a melting peak in reference to the shape of the plotted DSC curve) is typically measured by the DSC (Differential Scanning calorimetry) technique for measuring the melting points or peaks of polyolefins as described in U.S. Pat. No. 5,783,638. It should be noted that many blends comprising two or more polyolefins will have more than one melting point or peak, many individual polyolefins will comprise only one melting point or peak.

An "olefin-based polymer," as used herein is a polymer that contains more than 50 mole percent polymerized olefin monomer (based on total amount of polymerizable monomers), and optionally, may contain at least one comonomer. Nonlimiting examples of olefin-based polymer include ethylene-based polymer and propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 mole percent polymerized propylene monomer (based on the total amount of polymerizable monomers) and, optionally, may contain at least one comonomer.

DETAILED DESCRIPTION

The present disclosure provides a process. In an embodiment, the process includes:

A. providing a fitment with a base having a wall thickness ($T_w$), the base comprising an ethylene/α-olefin multi-block copolymer;

B. placing the base between two opposing multilayer films, each multilayer film having a respective seal layer comprising an olefin-based polymer;

C. positioning the base and opposing multilayer films between opposing seal bars, each seal bar comprising
  (i) a front surface,
  (ii) a recessed surface a distance (x) behind the front surface, the recessed surface having a first end and an opposing second end, and
  (iii) a curved surface at each opposing end, the curved surface extending between the front surface and the recessed surface, each curved surface having a radius of curvature (Rc) greater than or equal to distance (x); and D. heat sealing the base to each multilayer film.

A. Fitment

The process includes providing a fitment 10. The fitment 10 has a base 12 and a top 14 as shown in FIG. 1. The fitment 10 may be made from one or more (i.e., a blend) of polymeric materials. The base 12 contains, or is otherwise formed from, an ethylene/α-olefin multi-block copolymer. The base 12 may be made from a polymeric blend composed of the ethylene/α-olefin multi-block copolymer and one or more additional polymers. Nonlimiting examples of suitable materials for blending with the ethylene/α-olefin multi-block copolymer include low density polyethylene (LDPE), linear low density polyethylene (LLDPE), high density polyethylene (HDPE), ethylene vinyl acetate (EVA), ethylene methyl acrylate (EMA), ethylene acrylic acid copolymer (EAA), propylene homopolymer, propylene copolymer, propylene impact copolymer.

Alternatively, the base 12 is made solely from the ethylene/α-olefin multi-block copolymer. The top 14 can be made from ethylene/α-olefin multi-block copolymer, other polymer, or a blend thereof. The top 14 may include suitable structure (such as threads, for example) for attachment with a closure.

The base 12 has an elliptical cross section shape. In an embodiment, the cross section shape of the base 12 (pre-sealing) is circular, or substantially circular.

In an embodiment, the base 12 excludes rigid type bases such as canoe-shaped base and/or winglet-type bases.

In an embodiment, the base is only composed of, or is otherwise formed solely from, the ethylene/α-olefin multi-block copolymer.

In an embodiment the entire fitment 10 (the base 12 and the top 14) is only composed of, or is otherwise solely formed from, the ethylene/α-olefin multi-block copolymer.

Figure 2:
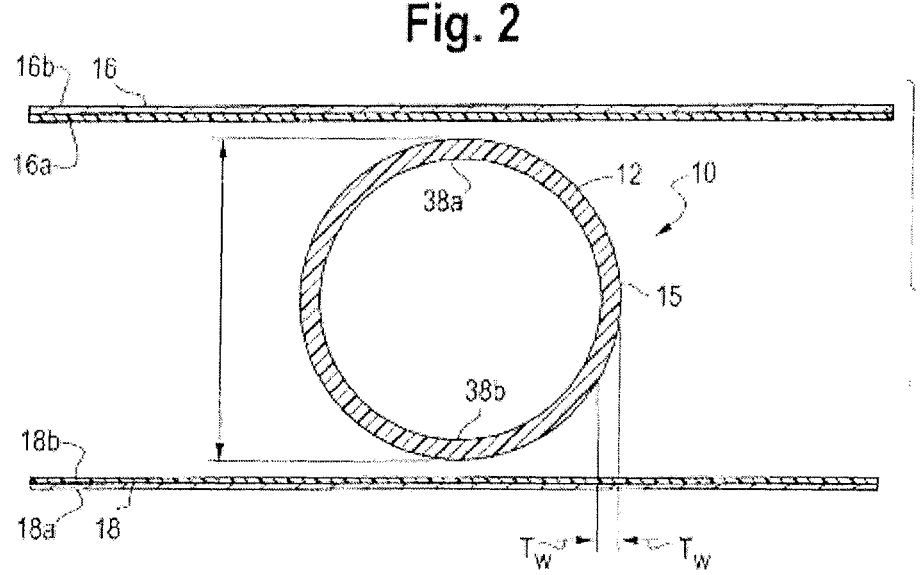
FIG. 2 is an elevation view of a fitment sandwiched between two multilayer films in accordance with an embodiment of the present disclosure.

In an embodiment, the base has a wall 15 with a thickness $T_w$, as shown in FIG. 2. The wall thickness $T_w$ is from 0.2 mm, or 0.3 mm, or 0.4 mm, or 0.5 mm, or 0.6 mm, or 0.7 mm, or 0.8 mm, or 0.9 mm, or 1.0 mm to 1.2 mm, or 1.5 mm, or 1.7 mm, or 1.9 mm, or 2.0 mm. In a further embodiment, $T_w$ is from 0.5 mm, or 0.7 mm, or 0.8 mm to 1.0 mm, or 1.2 mm, or 1.5 mm and the wall 15 is solely composed of the ethylene/α-olefin multi-block copolymer.

The base 12 is formed from (wholly or partially) ethylene/α-olefin multi-block copolymer. The term "ethylene/α-olefin multi-block copolymer" includes ethylene and one or more copolymerizable α-olefin comonomer in polymerized form, characterized by multiple blocks or segments of two or more polymerized monomer units differing in chemical or physical properties. The term "ethylene/α-olefin multi-block copolymer" includes block copolymer with two blocks (di-block) and more than two blocks (multi-block). The terms "interpolymer" and "copolymer" are used interchangeably herein. When referring to amounts of "ethylene" or "comonomer" in the copolymer, it is understood that this means polymerized units thereof.

In some embodiments, the ethylene/α-olefin multi-block copolymer can be represented by the following formula:

$$(AB)_n$$

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows:

AAA-AA-BBB-BB

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole block copolymer, i.e., ethylene comprises at least 50 mole percent of the whole polymer. More preferably ethylene comprises at least 60 mole percent, at least 70 mole percent, or at least 80 mole percent, with the substantial remainder of the whole polymer comprising at least one other comonomer that is preferably an α-olefin having 3 or more carbon atoms. In some embodiments, the ethylene/α-olefin multi-block copolymer may comprise 50 mol % to 90 mol % ethylene, or 60 mol % to 85 mol %, or 65 mol % to 80 mol %. For many ethylene/octene multi-block copolymers, the composition comprises an ethylene content greater than 80 mole percent of the whole polymer and an octene content of from 10 to 15, or from 15 to 20 mole percent of the whole polymer.

The ethylene/α-olefin multi-block copolymer includes various amounts of "hard" segments and "soft" segments. "Hard" segments are blocks of polymerized units in which ethylene is present in an amount greater than 90 weight percent, or 95 weight percent, or greater than 95 weight percent, or greater than 98 weight percent based on the weight of the polymer, up to 100 weight percent. In other words, the comonomer content (content of monomers other than ethylene) in the hard segments is less than 10 weight percent, or 5 weight percent, or less than 5 weight percent, or less than 2 weight percent based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 weight percent, or greater than 8 weight percent, greater than 10 weight percent, or greater than 15 weight percent based on the weight of the polymer. In some embodiments, the comonomer content in the soft segments can be greater than 20 weight percent, greater than 25 weight percent, greater than 30 weight percent, greater than 35 weight percent, greater than 40 weight percent, greater than 45 weight percent, greater than 50 weight percent, or greater than 60 weight percent and can be up to 100 weight percent.

The soft segments can be present in an ethylene/α-olefin multi-block copolymer from 1 weight percent to 99 weight percent of the total weight of the ethylene/α-olefin multi-block copolymer, or from 5 weight percent to 95 weight percent, from 10 weight percent to 90 weight percent, from 15 weight percent to 85 weight percent, from 20 weight percent to 80 weight percent, from 25 weight percent to 75 weight percent, from 30 weight percent to 70 weight percent, from 35 weight percent to 65 weight percent, from 40 weight percent to 60 weight percent, or from 45 weight percent to 55 weight percent of the total weight of the ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Inter-polymers," filed on Mar. 15, 2006, in the name of Cohn L. P. Shan, Lonnie Hazlitt, et al. and assigned to Dow Global Technologies Inc., the disclosure of which is incorporated by reference herein in its entirety. In particular, hard segment and soft segment weight percentages and comonomer content may be determined as described in Column 57 to Column 63 of U.S. Pat. No. 7,608,668.

The ethylene/α-olefin multi-block copolymer is a polymer comprising two or more chemically distinct regions or segments (referred to as "blocks") preferably joined (or covalently bonded) in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the ethylene/α-olefin multi-block copolymer is produced in a continuous process and possesses a polydispersity index (Mw/Mn) from 1.7 to 3.5, or from 1.8 to 3, or from 1.8 to 2.5, or from 1.8 to 2.2. When produced in a batch or semi-batch process, the ethylene/α-olefin multi-block copolymer possesses Mw/Mn from 1.0 to 3.5, or from 1.3 to 3, or from 1.4 to 2.5, or from 1.4 to 2.

In addition, the ethylene/α-olefin multi-block copolymer possesses a PDI (or Mw/Mn) fitting a Schultz-Flory distribution rather than a Poisson distribution. The present ethylene/α-olefin multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phvs.* (1997) 107 (21), pp 9234-9238.

In an embodiment, the present ethylene/α-olefin multi-block copolymer possesses a most probable distribution of block lengths.

In a further embodiment, the ethylene/α-olefin multi-block copolymer of the present disclosure, especially those made in a continuous, solution polymerization reactor, possess a most probable distribution of block lengths. In one embodiment of this disclosure, the ethylene multi-block interpolymers are defined as having:

(A) Mw/Mn from about 1.7 to about 3.5, at least one melting point, Tm, in degrees Celsius, and a density, d, in grams/cubic centimeter, where in the numerical values of Tm and d correspond to the relationship:

$Tm > -2002.9 + 4538.5(d) - 2422.2(d)^2$, or (B) Mw/Mn from about 1.7 to about 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

$\Delta T > -0.1299 \Delta H + 62.81$ for $\Delta H$ greater than zero and up to 130 J/g $\Delta T \geq 48°$ C. for $\Delta H$ greater than 130 J/g wherein the CRYSTAF peak is determined using at least 5 percent of the cumulative polymer, and if less than 5 percent of the polymer has an identifiable CRYSTAF peak, then the CRYSTAF temperature is 30° C.; or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$Re > 1481 - 1629(d)$; or (D) has a molecular weight fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; or (E) has a storage modulus at 25° C., G'(25° C.), and a storage modulus at 100° C., G'(100° C.), wherein the ratio of G'(25° C.) to G'(100° C.) is in the range of about 1:1 to about 9:1.

The ethylene/α-olefin multi-block copolymer may also have:

(F) molecular fraction which elutes between 40° C. and 130° C. when fractionated using TREF, characterized in that the fraction has a block index of at least 0.5 and up to about 1 and a molecular weight distribution, Mw/Mn, greater than about 1.3; or (G) average block index greater than zero and up to about 1.0 and a molecular weight distribution, Mw/Mn greater than about 1.3.

Suitable monomers for use in preparing the present ethylene/α-olefin multi-block copolymer include ethylene and one or more addition polymerizable monomers other than ethylene. Examples of suitable comonomers include straight-chain or branched α-olefins of 3 to 30 carbon atoms, or 4 to 20 carbon atoms, or 4 to 10 carbon atoms, or 4 to 8 carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, or 4 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

The ethylene/α-olefin multi-block copolymer can be produced via a chain shuttling process such as described in U.S. Pat. No. 7,858,706, which is herein incorporated by reference. In particular, suitable chain shuttling agents and related information are listed in Col. 16, line 39 through Col. 19, line 44. Suitable catalysts are described in Col. 19, line 45 through Col. 46, line 19 and suitable co-catalysts in Col. 46, line 20 through Col. 51 line 28. The process is described throughout the document, but particularly in Col. 51, line 29 through Col. 54, line 56. The process is also described, for example, in the following: U.S. Pat. Nos. 7,608,668; 7,893, 166; and 7,947,793.

In an embodiment, the ethylene/α-olefin multi-block copolymer has hard segments and soft segments and is defined as having:

a Mw/Mn from 1.7 to 3.5, at least one melting point, Tm, in degrees Celsius, and a density, d, in grams/cubic centimeter, where in the numerical values of Tm and d correspond to the relationship:

$Tm < -2002.9 + 4538.5(d) - 2422.2(d)^2$, where d is from 0.86 g/cc, or 0.87 g/cc, or 0.88 g/cc to 0.89 g/cc; and Tm is from 80° C., or 85° C., or 90° C. to 95, or 99° C., or 100° C., or 105° C. to 110° C., or 115° C., or 120° C., or 125° C.

In an embodiment, the ethylene/α-olefin multi-block copolymer is an ethylene/octene multi-block copolymer and has one, some, any combination of, or all the properties (i)-(ix) below:

(i) a melt temperature (Tm) from 80° C., or 85° C., or 90° C. to 95, or 99° C., or 100° C., or 105° C. to 110° C., or 115° C., or 120° C., or 125° C.;

(ii) a density from 0.86 g/cc, or 0.87 g/cc, or 0.88 g/cc to 0.89 g/cc;

(iii) 50-85 wt % soft segment and 40-15 wt % hard segment;

(iv) from 10 mol %, or 13 mol %, or 14 mol %, or 15 mol % to 16 mol %, or 17 mol %, or 18 mol %, or 19 mol %, or 20 mol % octene in the soft segment;

(v) from 0.5 mol %, or 1.0 mol %, or 2.0 mol %, or 3.0 mol % to 4.0 mol %, or 5 mol %, or 6 mol %, or 7 mol %, or 9 mol % octene in the hard segment;

(vi) a melt index (MI) from 1 g/10 min, or 2 g/10 min, or 5 g/10 min, or 7 g/10 min to 10 g/10 min, or 15 g/10 min to 20 g/10 min;

(vii) a Shore A hardness from 65, or 70, or 71, or 72 to 73, or 74, or 75, or 77, or 79, or 80;

(viii) an elastic recovery (Re) from 50%, or 60% to 70%, or 80%, or 90%, at 300% 300% $min^{-1}$ deformation rate at 21° C. as measured in accordance with ASTM D 1708; and (ix) a polydisperse distribution of blocks and a polydisperse distribution of block sizes.

In an embodiment, the ethylene/α-olefin multi-block copolymer is an ethylene/octene multi-block copolymer.

The present ethylene/α-olefin multi-block copolymer may comprise two or more embodiments disclosed herein.

In an embodiment, the ethylene/octene multi-block copolymer is sold under the Tradename INFUSE™ available from The Dow Chemical Company, Midland, Mich., USA. In a further embodiment, the ethylene/octene multi-block copolymer is INFUSE™ 9817.

In an embodiment, the ethylene/octene multi-block copolymer is INFUSE™ 9500.

In an embodiment, the ethylene/octene multi-block copolymer is INFUSE™ 9507.

B. Multilayer Films

The process includes placing the fitment base between two opposing multilayer films. The base 12 is placed, or otherwise is positioned, between two opposing multilayer films, multilayer film 16 and multilayer film 18 as shown in FIG. 2. Each multilayer film has a respective seal layer containing an olefin-based polymer.

In an embodiment, each multilayer film is flexible and has at least two, on at least three layers. The flexible multilayer film is resilient, flexible, deformable, and pliable. The structure and composition for each multilayer film may be the same or different. For example, each of two opposing multilayer films can be made from a separate web, each web having a unique structure and/or unique composition, finish, or print. Alternatively, each multilayer film can be the same structure and the same composition.

In an embodiment, each multilayer film 16, 18 is a flexible multilayer film having the same structure and the same composition.

Each flexible multilayer film 16, 18 may be (i) a coextruded multilayer structure or (ii) a laminate, or (iii) a combination of (i) and (ii). In an embodiment, each flexible multilayer film 16, 18 has at least three layers: a seal layer, an outer layer, and a tie layer between. The tie layer adjoins the seal layer to the outer layer. The flexible multilayer film may include one or more optional inner layers disposed between the seal layer and the outer layer.

In an embodiment, the flexible multilayer film is a coextruded film having at least two, or three, or four, or five, or six, or seven to eight, or nine, or 10, or 11, or more layers. Some methods, for example, used to construct films are by cast co-extrusion or blown co-extrusion methods, adhesive lamination, extrusion lamination, thermal lamination, and coatings such as vapor deposition. Combinations of these methods are also possible. Film layers can comprise, in addition to the polymeric materials, additives such as stabilizers, slip additives, antiblocking additives, process aids, clarifiers, nucleators, pigments or colorants, fillers and reinforcing agents, and the like as commonly used in the packaging industry. It is particularly useful to choose additives and polymeric materials that have suitable organoleptic and or optical properties.

The seal layer is a material capable of sealing the films to each other and capable of sealing to the fitment. Nonlimiting examples of suitable polymeric materials for the seal layer include olefin-based polymer (including any ethylene/$C_3$-$C_{10}$ α-olefin copolymers linear or branched), propylene-based polymer (including plastomer and elastomer, random propylene copolymer, propylene homopolymer, and propylene impact copolymer), ethylene-based polymer (including plastomer and elastomer, high density polyethylene ("HDPE"), low density polyethylene ("LDPE"), linear low density polyethylene ("LLDPE"), medium density polyethylene ("MDPE"), ethylene-acrylic acid or ethylene-methacrylic acid and their ionomers with zinc, sodium, lithium, potassium, magnesium salts, ethylene vinyl acetate copolymers and blends thereof.

Nonlimiting examples of suitable polymeric material for the outer layer include those used to make biaxially or monoaxially oriented films for lamination as well as coextruded films. Some nonlimiting polymeric material examples are biaxially oriented polyethylene terephthalate (OPET), monoaxially oriented nylon (MON), biaxially oriented nylon (BON), and biaxially oriented polypropylene (BOPP). Other polymeric materials useful in constructing film layers for structural benefit are polypropylenes (such as propylene homopolymer, random propylene copolymer, propylene impact copolymer, thermoplastic polypropylene (TPO) and the like, propylene-based polymers (e.g., VERSIFY™ or VISTAMAX™)), polyamides (such as Nylon 6, Nylon 6,6, Nylon 6,66, Nylon 6,12, Nylon 12 etc.), polyethylene norbornene, cyclic olefin copolymers, polyacrylonitrile, polyesters, copolyesters (such as PETG), cellulose esters, polyethylene and copolymers of ethylene such as HDPE or such as LLDPE based on ethylene octene copolymer such as DOWLEX™, blends thereof, and multilayer combinations thereof.

Nonlimiting examples of suitable polymeric materials for the tie layer include functionalized ethylene-based polymers such as ethylene-vinyl acetate ("EVA"), polymers with maleic anhydride-grafted to polyolefins such as any polyethylene, ethylene-copolymers (for example, DOWLEX™ LLDPE or ELITE™ enhanced polyethylene sold by TDDC), or polypropylene, and ethylene acrylate copolymers such an ethylene methyl acrylate ("EMA"), glycidyl containing ethylene copolymers, propylene and ethylene based olefin block copolymers (OBC) such as INTUNE™ (PP-OBC) and INFUSE™ (PE-OBC) both available from The Dow Chemical Company, and blends thereof.

The flexible multilayer film may include additional layers which may contribute to the structural integrity or provide specific properties. The additional layers may be added by direct means or by using appropriate tie layers to the adjacent polymer layers. Polymers which may provide additional mechanical performance such as stiffness or opacity, as well polymers which may offer gas barrier properties or chemical resistance can be added to the structure.

Nonlimiting examples of suitable material for the optional barrier layer include copolymers of vinylidene chloride and methyl acrylate, methyl methacrylate or vinyl chloride (e.g., SARAN™ resins available from The Dow Chemical Company); vinylethylene vinyl alcohol (EVOH), metal foil (such as aluminum foil). Alternatively, modified polymeric films such as vapor deposited aluminum or silicon oxide on such films as BON, OPET, or OPP, can be used to obtain barrier properties when used in laminate multilayer film.

In an embodiment, the flexible multilayer film includes a seal layer selected from LLDPE (sold under the trade name DOWLEX™ (The Dow Chemical Company)), single-site LLDPE (m-LLDPE) or substantially linear, or linear, plastomers or elastomers, including polymers sold under the trade name AFFINITY™ plastomer or ELITE™ enhanced polyethylene (The Dow Chemical Company) for example, ethylene vinyl acetate (EVA), ethylene ethyl acrylate (EEA), propylene-based plastomers or elastomers such as VERSIFY™ (The Dow Chemical Company), grafted olefin-based polymer (MAH-grafted), and blends thereof. An optional tie layer is selected from either ethylene-based olefin block copolymer PE-OBC (sold as INFUSE™) or propylene-based olefin block copolymer PP-OBC (sold as INTUNE™). The outer layer includes greater than 50 wt % of resin(s) having a melting point, Tm, that is from 25° C. to 30° C., or 40° C. or higher than the melting point of the polymer in the seal layer wherein the outer layer polymer is selected from resins such as AFFINITY™ plastomer, LLDPE (DOWLEX™), VERSIFY™ propylene based polymer or VISTAMAX, ELITE™ enhanced polyethylene, MDPE, HDPE or a propylene-based polymer such as propylene homopolymer, propylene impact copolymer or TPO.

In an embodiment, the flexible multilayer film is co-extruded.

In an embodiment, flexible multilayer film includes a seal layer selected from LLDPE (sold under the trade name DOWLEX™ (The Dow Chemical Company)), single-site LLDPE (m-LLDPE) or substantially linear, or linear, olefin plastomers or elastomers, including polymers sold under the trade name AFFINITY™ or ELITE™ (The Dow Chemical Company) for example, propylene-based plastomers or elastomers such as VERSIFY™ (The Dow Chemical Company), grafted olefin-based polymer (MAH-grafted), and blends thereof. The flexible multilayer film also includes an outer layer that is a polyamide.

In an embodiment, the flexible multilayer film is a coextruded film or a laminated film, the seal layer is composed of an ethylene-based polymer, such as a linear or a substantially linear polymer, or a single-site catalyzed linear or substantially linear polymer of ethylene and an alpha-olefin monomer such as 1-butene, 1-hexene or 1-octene, having a Tm from 55° C. to 115° C. and a density from 0.865 to 0.925 g/cm³, or from 0.875 to 0.910 g/cm³, or from 0.888 to 0.900 g/cm³. The outer layer is composed of a material selected from HDPE, LLDPE, OPET, OPP (oriented polypropylene), BOPP, polyamide, and combinations thereof.

In an embodiment, the flexible multilayer film is a coextruded film or a laminated film having at least five layers, the coextruded film having a seal layer composed of an ethylene-based polymer, such as a linear or substantially linear polymer, or a single-site catalyzed linear or substantially linear polymer of ethylene and an alpha-olefin comonomer such as 1-butene, 1-hexene or 1-octene, the ethylene-based polymer having a Tm from 55° C. to 115° C. and a density from 0.865 to 0.925 g/cm³, or from 0.875 to 0.910 g/cm³, or from 0.888 to 0.900 g/cm³ and an outermost layer composed of a material selected from HDPE, LLDPE, OPET, OPP (oriented polypropylene), BOPP, polyamide, and combinations thereof.

In an embodiment, the flexible multilayer film is a coextruded film or a laminated film having at least seven layers. The seal layer is composed of an ethylene-based polymer, such as a linear or substantially linear polymer, or a single-site catalyzed linear or substantially linear polymer of ethylene and an alpha-olefin comonomer such as 1-butene, 1-hexene or 1-octene, the ethylene-based polymer having a Tm from 55° C. to 115° C. and density from 0.865 to 0.925 g/cm³, or from 0.875 to 0.910 g/cm³, or from 0.888 to 0.900 g/cm³. The outer layer is composed of a material selected from HDPE, LLDPE, OPET, OPP (oriented polypropylene), BOPP, polyamide, and combinations thereof.

In an embodiment, the flexible multilayer film is a coextruded (or laminated) five layer film, or a coextruded (or laminated) seven layer film having at least two layers containing an ethylene-based polymer. The ethylene-based polymer may be the same or different in each layer.

In an embodiment, the flexible multilayer film is a coextruded (or laminated) five layer, or a coextruded (or laminated) seven layer film having at least one layer containing a material selected from HDPE, LLDPE, OPET, OPP (oriented polypropylene), BOPP, and polyamide.

In an embodiment, the flexible multilayer film is a coextruded (or laminated) five layer, or a coextruded (or laminated) seven layer film having at least one layer containing OPET or OPP.

In an embodiment, the flexible multilayer film is a coextruded (or laminated) five layer, or a coextruded (or laminated) seven layer film having at least one layer containing polyamide.

In an embodiment, the flexible multilayer film is a seven-layer coextruded (or laminate) film with a seal layer composed of an ethylene-based polymer, or a linear or substantially linear polymer, or a single-site catalyzed linear or substantially linear polymer of ethylene and an alpha-olefin monomer such as 1-butene, 1-hexene or 1-octene, having a Tm from 90° C. to 106° C. The outer layer is a polyamide having a Tm from 170° C. to 270° C. The film has a ΔTm from 40° C. to 200° C. The film has an inner layer (first inner layer) composed of a second ethylene-based polymer, different than the ethylene-based polymer in the seal layer. The film has an inner layer (second inner layer) composed of a polyamide the same or different to the polyamide in the outer layer. The seven layer film has a thickness from 100 micrometers to 250 micrometers.

C. Seal Bars

The present process includes positioning the base and opposing multilayer films between opposing heated seal bars. FIG. 2 shows the base 12 located between multilayer film 16 and multilayer film 18. Multilayer film 16 has seal layer 16a and outermost layer 16b. Similarly, multilayer film 18 has seal layer 18a and outermost layer 18b. Although FIG. 2 shows each multilayer film 16, 18 with two layers, it is understood that each multilayer film can have from 2, or 3, or 4, or 5, or 6 to 7, or 8, or 9, or 10, or 11 or more layers. The base 12 is located, or otherwise is "sandwiched," between multilayer film 16 and the multilayer film 18. The film-base-film sandwich is placed in a heat seal apparatus 19 (FIG. 3) where the film-base-film sandwich is positioned between opposing seal bars—seal bar 20 and seal bar 22. Seal bar 20 opposes seal bar 22. Heat seal apparatus 19 includes suitable structure and mechanism (i) to heat the seal bars, and (ii) to move the seal bars 20, 22 toward and away from each other in order to perform a heat sealing procedure.

Figure 3:
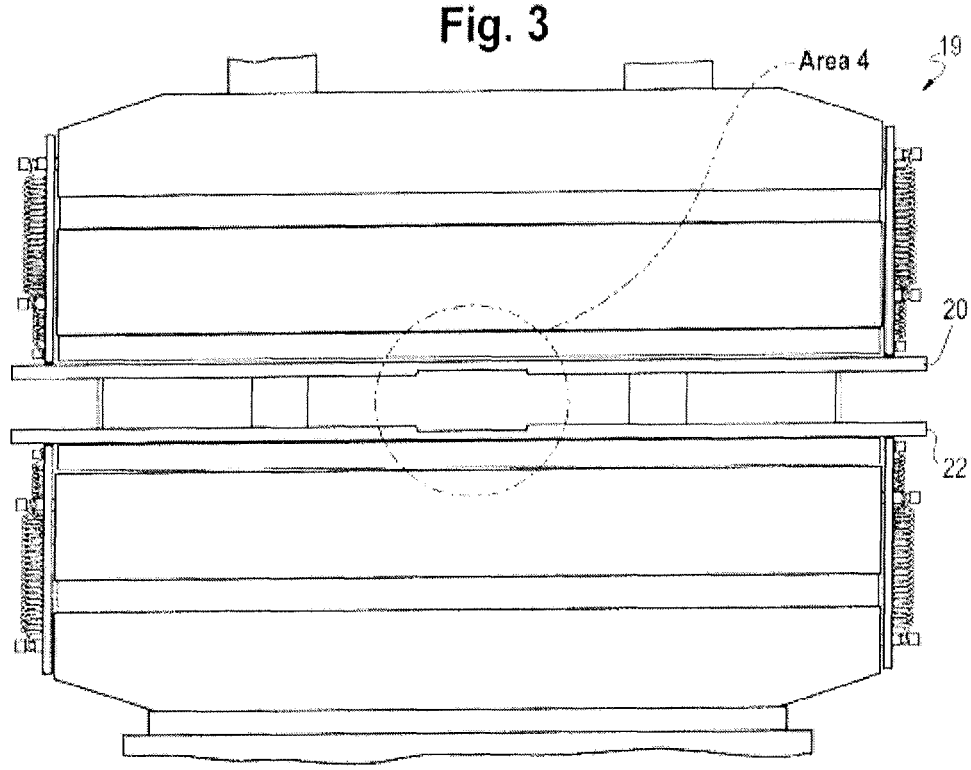
FIG. 3 is an elevation view of a heat seal apparatus in accordance with an embodiment of the present disclosure.
Figure 4:
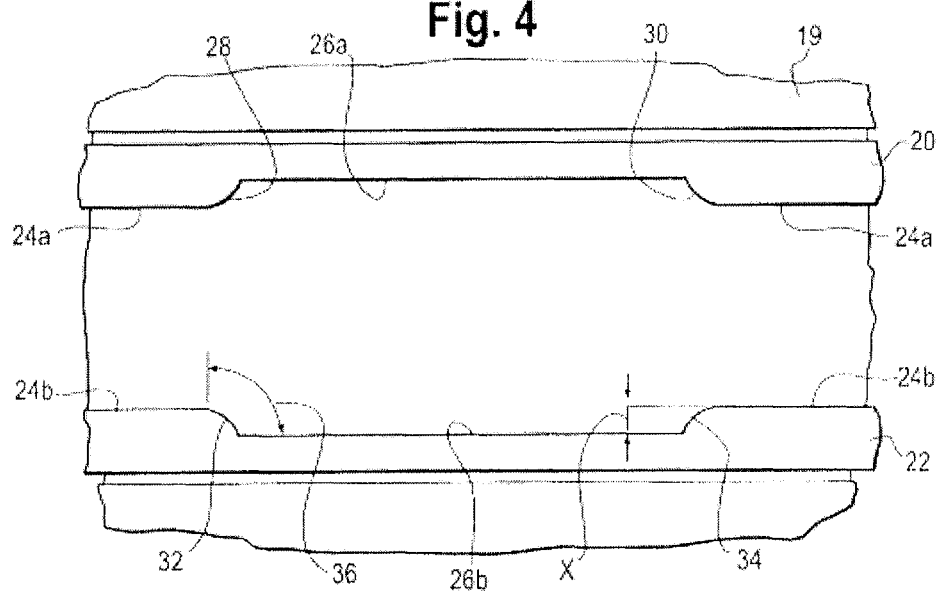
FIG. 4 is an enlarged elevation view of area 4 of FIG. 3 in accordance with an embodiment of the present disclosure.

FIG. 4 is an enlarged view of Area 4 of FIG. 3. In FIG. 4, each seal bar 20, 22 includes a respective front surface 24a, 24b, a respective recessed surface 26a, 26b, and respective curved surfaces 28, 30 (for seal bar 20) and curved surfaces 32, 34 (for seal bar 22). The curved surface 28 extends between a first end of recessed surface 26a and a first end of the front surface 24a (for seal bar 20). The curved surface 30 extends between a second end of the recessed surface 26a and a second end of the front surface 24a.

Similarly, the curved surface 32 extends between a first end of the recessed surface 26b and a first end of the front surface 24b (seal bar 22). The curved surface 34 extends between a second end of the recessed surface 26b and a second end of the front surface 24b.

Each recessed surface is situated, or otherwise is located, behind its respective front surface. FIG. 4 shows recessed surface 26b a distance (x) behind the front surface 24b for heat seal bar 22. Although FIG. 4 shows distance (x) for seal bar 22 only, it is understood that seal bar 20 has a similar distance (x) between the front surface 24a and the recessed surface 26a.

Distance (x) and the base wall thickness $T_w$ are interrelated. Formula 1 sets forth the relationship between distant (x) and the base wall thickness, $T_w$:

$$X = \text{from } 0.8(T_w) \text{ to } 1.1(T_w); \text{ or}$$

$$X = 0.8(Tw), \text{ or } 0.9(T_w), \text{ or } 1.0(T_w) \text{ to } 1.1(T_w) \quad \text{Formula 1}$$

Each curved surface 28, 30, 32, 34 has a radius of curvature. The "radius of curvature," or "Rc," is the radius of an imaginary circle that fits the seal bar curved surface. In other words, the seal bar curved surface is a local section that is encircled by the imaginary circle, the imaginary circle having a radius. The radius of the imaginary circle is the radius of curvature.

FIG. 4 shows a radius of curvature 36 for the curved surface 32. Although FIG. 4 shows the radius of curvature for curved surface 32 only, it is understood that the other curved surfaces 28, 30, and 34 have a similar radius of curvature. The Rc has a value (in millimeters, mm) that is from greater than or equal to distance (x). In an embodiment, the Rc has a value that is from distance (x), (i.e., 1(x)), or 1.1(x) to 1.2(x), or 1.3(x) to 1.5(x), or 1.7(x), or 1.9(x), or 2.0(x).

The Rc for each curved surface 28, 30, 32, 34 can be the same or different. In an embodiment, the Rc for each curved surface is the same.

In an embodiment, the Rc for each curved surface is the same and the value for Rc equals distance (x) (in mm).

As shown in FIG. 5, the process includes positioning the base 12 and opposing multilayer films 16, 18 between opposing seal bars 20, 22. The seal bars 20 and 22 are heated and the process includes sealing the base to the multilayer films with the base 12 sandwiched between multilayer film 16 and multilayer film 18.

The seal bars 20, 22 are closed (as shown by opposing arrows A in FIG. 6) to impinge upon, or otherwise compress or flatten, the multilayer films 16, 18 and the base 12. The compression force and heat imparted by the opposing seal bars 20, 22 simultaneously (i) flattens, or otherwise deforms, the base 12; (ii) compresses the seal layer of each multilayer film 16, 18 against the outer surface of the base 12, (iii) melts the ethylene-based polymer in the seal layers, (iv) softens and/or melts at least some of the ethylene/α-olefin multi-block copolymer present in the base 12, (v), forms a flowable caulk 37 composed of (a) the ethylene/α-olefin multi-block copolymer from the base, (b) the ethylene-based polymer from the seal layers, or (c) a combination of (a) and (b); and (vi) welds upper portion/lower portion 38a, 38b to respective seal layers of films 16, 18.

As the base 12 flattens, the multilayer films 16, 18 and the base 12 fill the volume between the closing seal bars 20, 22. In FIG. 7, the seal bars 20, 22 are in a fully closed position, with the base 12 fully compressed such that top side 38a of the base wall 15 touches the opposing bottom side 38b of the base wall. When fully compressed, the flattened base 12 has a compressed based length (or "CBL"), length B (in FIG. 7), that is greater than the recessed surface length (or "RSL"), length C.

In an embodiment, the CBL is from 0.2 mm, or 0.5 mm, or 0.7 mm, or 1.0 mm to 1.2 mm, or 1.5 mm greater than the length of the RSL.

In an embodiment, the CBL is from 1.02, or 1.03, or 1.04, to 1.05, or 1.06, or 1.07, or 1.08, or 1.09, or 1.10, or 1.20, or 1.30, or 1.40, or 1.50 times greater than the length of the RSL (in millimeters).

In FIG. 7, flattened base ends 40a, 40b extend respective distances D and E beyond the distance C, the recessed surface length (RSL). With the seal bars 20, 22 fully closed, the curved sections 28, 30, 32, 34 protrude inwardly toward the base center, the curved sections imparting additional force onto the films and onto flattened base ends 40a, 40b. This additional force to the film and the flattened base ends pushes the caulk 37 away from the base center.

When the seal bars 20, 22 are fully closed, Formula (1) (x=0.8–1.1($T_w$)) demonstrates that the recess width F is from 1.6 (x) to 2.2(x). However, the thickness of each multilayer film makes the overall material volume greater than the recess volume at width F. Thus, the protruding force from the curved surfaces push the caulk 37 outward. The curved surfaces 28, 30, 32, 34 pinch the caulk 37 and move the caulk 37 to completely fill all gaps and completely fill the recess volume when the seal bars are in the closed position (i.e., width F). The pinching by the protruding curved surfaces deforms the melted and pliable base ends 40a, 40b and the seal layers of the multilayer films, and shapes the caulk 37 into in situ winglets 44 and 46 (FIG. 8).

The heat sealing step includes adjoining, or otherwise welding, each multilayer film 16, 18 to respective upper portion 38a and a lower portion 38b of the base 12 as shown in FIGS. 6 and 7.

In an embodiment, the process includes:

(i) selecting, for the base, an ethylene/α-olefin multi-block copolymer, or an ethylene/$C_4$-$C_8$ α-olefin copolymer, having a melt temperature, Tm1, from 115° C. to 125° C.;

(ii) selecting, for the seal layers, an olefin-based polymer having a melt temperature, Tm2, such that Tm2 is from 10° C. to 40° C. less than Tm1.

In an embodiment, Tm2 is from 10° C., or 15° C., or 20° C. to 25° C., or 30° C., or 35° C., or 40° C. less than Tm1.

In an embodiment, each seal layer is formed from an ethylene/$C_4$-$C_8$ α-olefin copolymer with a Tm2 from 10° C.

to 40° C. less than the Tm1 of the ethylene/α-olefin multi-block copolymer in the base 12. The flat seal bars 20, 22 are heated to a temperature greater than the melt temperature (Tm2) of the seal layer ethylene-based polymer and less than or equal to the melt temperature, Tm1 (or to at least the softening temperature of the ethylene/α-olefin multi-block copolymer), of the base 12. The compression force and heat imparted by the opposing seal bars 20, 22 simultaneously (i) flatten, or otherwise deform, the base 12; (ii) compress the seal layer of each multilayer film 16, 18 against the outer surface of the base 12; (iii) pinch (by way of curved surfaces 28, 30, 32, 34) the flattened base ends 40a, 40b to form the caulk 37 and the in situ winglets 44 and 46; and (iv) weld upper portion/lower portion 38a, 38b to respective seal layers of films 16, 18.

The compression force and the heating of the closed seal bars 20, 22 in combination with the pinching force imparted by the curved surfaces 28, 30, 32, 34 forces the flowable caulk 37 to move, or otherwise flow, away from the outer surface of the base 12 and fill any interstitial gaps between the multilayer films 16, 18 and the base 12.

In an embodiment, the sealing step entails one, some, or all of the following seal conditions:

(i) a temperature from 130° C., or 140° C., or 150° C., or 160° C., or 170° C. to 180° C., or 190° C., or 200° C.;

(ii) a pressure (or seal force) from 10 Newtons (N)/cm$^2$, or 20 N/cm$^2$, or 30 N/cm$^2$, to 40 N/cm$^2$, to 50 N/cm$^2$; and (iii) application of (i) and/or (ii) for a duration (seal time or dwell time) from 0.1 seconds, or 0.5 seconds, or 0.75 seconds, or 1.0 second, or 2.0 seconds, or 3.0 seconds, or 4.0 seconds, or 5.0 seconds to 6.0 seconds, or 7.0 seconds, or 8.0 seconds, or 9.0 seconds or 10 seconds.

The process includes opening the closed seal bars 20, 22, thereby removing the compression force (and the pinching force) and removing the heat from the base 12 and the multilayer films 16, 18. In FIG. 8, arrows O show the opening of the seal bars 20, 22 and the removal of the compression force from the base 12. When the closed seal bars 20, 22 are opened, the elasticity provided by the ethylene/α-olefin multi-block copolymer in the base 12 enables the base 12 to recoil, or otherwise spring back, from the compressed and flattened configuration in FIG. 7 and return to an open position as shown in FIG. 8. The recoil motion of the base 12 is shown with arrows G in FIG. 8. With recoil, the opposing interior portions of the base wall 15 move away from each other and upper base portion 38a no longer contacts lower base portion 38b. The interior of the base 12 is not sealed to itself. With recoil, the base 12 recovers, and opens, to an elliptical cross section shape after the sealing step as shown in FIGS. 8-9.

In an embodiment, the post-flattened base 12 can have either a circular cross-section or an elliptical cross-section H as shown in FIG. 9. Applicant discovered that the base 12 composed of the ethylene/α-olefin multi-block copolymer and having a wall 15 thickness from 0.2 mm to 2.0 mm enables the base 12 to withstand the compression force without damage such as crazing, cracking or breaking during full collapse, yet advantageously has sufficient elasticity to spring back, or otherwise recoil, to an open configuration upon opening of seal bars 20,22.

Opening the seal bars 20, 22 forms a welded base 42 as shown in FIG. 9. The welded base 42 includes multilayer film 16 welded to the base 12 at upper portion 38a, multilayer film 18 welded to the base 12 at lower portion 38b, and the multilayer films 16, 18 welded to each other where the seal layers directly contact each other. The welded base 42 also includes in situ winglets 44 and 46. Upon cooling, the caulk 37 solidifies and forms in situ winglets 44, 46. The in situ winglets 44, 46 completely fill any gaps between the films and the base, and form a hermetic seal between the base 12 and the multilayer films 16, 18. An "in situ winglet," as used herein, is a structure that is an extension of the base 12, the in situ winglet being the polymeric solidification of a flowable caulk (caulk 37) composed of the ethylene/α-olefin multi-block copolymer (from the base). The caulk 37 is created when the base 12 and the multilayer films 16, 18 are flattened under heat and the caulk 37 is pinched and shaped by the protruding curved surfaces 28, 30, 32, 34. The caulk 37 solidifies when subjected to the pinching of the curved surfaces 28, 30, 32, 34. The in situ winglets are composed of, or otherwise are formed from, (i) the ethylene/α-olefin multi-block copolymer (from the base 12), or (ii) a blend of the ethylene/α-olefin multi-block copolymer and the olefin-based polymer (ethylene/$C_4$-$C_8$ α-olefin copolymer) (from the seal layer). In this way, the curved sections 28, 30, 32, and 34 form the winglets 44, 46 in situ, during the sealing process.

In an embodiment, the process includes forming winglet 44 and winglet 46 having respective lengths I and J. The lengths I and J can be from 0.5 mm, or 1.0 mm, or 2.0 mm, or 3.0 mm, or 4.0 mm, or 5.0 mm as shown in FIG. 9.

The presence of little or no curvature at the ends of the recessed surface (26a, 26b) results in excessive localized pressure at the flattened base ends because the recessed surface length (distance C) is less than the compressed base length (distance B). With no curvature, the sharp ends of the recessed surface apply very high pressure and clip the ends of the flattened base in a "guillotine effect." Too large of a Rc for the curved surface (multiples of x) leaves empty spaces for the melted and flowing ethylene/α-olefin multi-block copolymer from the base material, resulting in gaps in the seal volume (i.e., the volume when seal bars are fully closed, distance F). causing leaks. Applicant discovered that when Rc=1x–2x, the length of the recessed surface provides a balanced pinch, and advantageously deforms and shapes the melted ethylene/α-olefin multi-block copolymer into in situ winglets.

D. Cold Sealing

The process may include an optional step of cold sealing the welded base 42. The welded base 42 remains in place between seal bars 20, 22. The seal bars 20, 22 close and compress the welded base 42. The cold sealing process is similar to the heat sealing step as seal bars 20, 22 close upon and compress the welded base. In the cold sealing step, the seal bars 20, 22 are at a lower temperature than the temperature in the heat sealing step.

The cold sealing ensures no small or micro interstitial gaps are present between the multilayer films 16, 18 and the base 12. The cold seal promotes solidification of the caulk to form the in situ winglets. The cold sealing also reduces, or eliminates, any wrinkles present in the welded base to improve optics for the welded base 42.

In an embodiment, the cold sealing step (with opposing seal bars 20, 22) includes one, some or all of the following seal conditions:

(i) a temperature from 18° C., or 20° C., or 22° C. to 25° C., or 30° C.;

(ii) a pressure from 10 N/cm$^2$, to 20 N/cm$^2$, or 30 N/cm$^2$, to 40 N/cm$^2$, to 50 N/cm$^2$;

(iii) application of (i) and/or (ii) for a duration (seal time or dwell time) from 0.1 seconds, or 0.5 seconds, or 1.0 second, or 2.0 seconds, or 3.0 seconds, or 4.0 seconds, or 5.0 seconds to 6.0 seconds, or 7.0 seconds, or 8.0 seconds, or 9.0 seconds or 10 seconds.

E. Other Sealing

In an embodiment, the process includes impulse sealing the welded base. An impulse heat sealing apparatus typically has two heating elements (one on a top bar and one on a bottom bar), the heating elements typically made of Nichrome (nickel-chrome alloy) placed between the seal bar and a release film or fabric.

In an embodiment, a Nichrome band (with a width from 6 mm, or 10 mm to 15 mm or 20 mm) is shaped to conform to the shape of the seal bar (see FIG. 4) with recessed surface such that the exact dimensions of the seal bars 20, 22 described herein apply. Alternatively, Nichrome bands are assembled with separate heating zones where one zone is in the recessed area of the seal bar and other zones are the front surfaces of the seal bar. The Nichrome bands separate zone supplies sufficient to heat the seal bar and affect sealing. The heating of the Nichrome bands may be continuous or may be intermittent. For either embodiment, the heating elements are not continuously heated; heat is generated only when current flows. The welded base is placed in the impulse heat sealing apparatus between the seal bars. The seal bars are closed to a pressure typically between 10N/cm$^2$ to 50N/cm$^2$, and an electric current heats the heating element for a specified time (similar times as hot bar sealing of 0.1 sec up to 3 or even higher such as 10 sec) to create the required temperature for forming heat seals. The seal bars remain closed in place after the heat is stopped thereby cooling the welded base. Passing cooling water through the seal bars may be used to reduce cool time of the seal bars. The impulse seal process allows the seals and winglets to fuse, or otherwise solidify, and prevents any potential damage to the welded base before moving the part to the next production stage. Thorough solidification of the welded base and winglets is advantageous for making hermetic seals.

F. Flexible Container

The process includes forming a flexible container. The opposing multilayer films 16, 18 are superimposed on each other and form a common peripheral edge 50 as shown in FIG. 10. The process includes sealing the multilayer films 16, 18 along the common peripheral edge and forming a flexible container 52. Formation of the seal along the common peripheral edge 50 can occur before, during or after, the heat sealing step. The process forms a hermetic seal 54 between the base 12 and the multilayer films 16 and 18 and hermetic seal between the multilayer films 16, 18.

The heat and stress imparted onto a fitment during heat sealing limits the materials that can be used to make the fitment. A fitment composed of low elasticity polyolefin (e.g., LDPE, HDPE) crushes, cracks, breaks, and is unusable. A fitment composed of a polyolefin elastomer (e.g., ENGAGE or VERSIFY elastomers) can exhibit deformation, yet does not recover adequately or welds shut. A fitment composed of a crosslinked elastomer (e.g., TPV) may fully recover but does not seal adequately and does not form a hermetic seal. Applicant surprisingly discovered that a fitment composed of the present ethylene/α-olefin multi-block copolymer recovers (recoils), will not seal to itself, and will seal the fitment to the film of the container using bar sealing.

Applicant further discovered that seal bars 20, 22 allow for the formation of in situ winglets immediately during the first (hot) stage of the heat seal process. The unique design of seal bars 20, 22 improves the robustness of the fitment seal by reducing the pressure between the base internal walls and preventing fitment collapse in case excessive temperature or time is used. The curved surfaces with Rc=1(x)–2(x) reduce the pressure over the base walls during the seal process. With RSL less than CBL, pinching results during the seal process which forms the winglets in situ. The curved surfaces with Rc=1(x)–2(x) prevent excessive pressure which could damage the base or film structures. The present process allows for more leeway in base—film alignment.

By way of example, and not limitation, examples of the present disclosure are provided.

Examples

Flexible multilayer films with structures shown in Table 1 below are used in the present examples.

1. Multilayer Films

TABLE 1

Composition of the Flexible Multilayer Film-Film 1
(7 layer co-extruded flexible multilayer film)

| Material | Description | Thickness (micrometers) |
|---|---|---|
| Polyamide | Nylon 6/66 viscosity number 195 cm$^3$/g (ISO 307 @ 0.5% in 96% H$_2$SO$_4$), melting point 196° C. (ISO 3146) | 12 |
| Tie Layer | Maleic anhydride grafted polyethylene 0.922 g/cm$^3$; 1.0 MI @ 2.16 Kg 190° C. | 17 |
| Polyethylene | Polyethylene density 0.916 g/cm$^3$; 1.0 MI @ 2.16 Kg 190° C. | 32 |
| Tie Layer | Maleic anhydride grafted polyethylene 0.922 g/cm$^3$; 1.0 MI @ 2.16 Kg 190° C. | 20 |
| Polyamide | Nylon 6/66 viscosity number 195 cm$^3$/g (ISO 307 @ 0.5% in 96% H$_2$SO$_4$), melting point 196° C. (ISO 3146) | 12 |
| Tie Layer | Maleic anhydride grafted polyethylene 0.922 g/cm$^3$; 1.0 MI @ 2.16 Kg 190° C. | 20 |
| HeatSeal Layer* | Ethylene alpha-olefin copolymer 0.899 g/cm$^3$; 1.0 MI @ 2.16 Kg 190° C. | 37 |
| Total thickness | | 150 |

*seal layer includes an anti-block agent to facilitate handling of the film during manufacturing of the container.

2. Fitments

Fitments with cylindrical base as shown in FIG. 1 are prepared by separately injection molding the following polymers: (i) Infuse™ 9817, ethylene/octene multi-block copolymer, available from The Dow Chemical Company; (ii) high density polyethylene, and (iii) Versify™ 4301 propylene/ethylene random copolymer, available from The Dow Chemical Company. The mold is built by modifying a mold of a canoe based fitment, replacing the base portion for a straight tube section. The base has a wall thickness, $W_t$, of 0.8 mm and an internal diameter of 12 mm, which corresponds to a compressed base length (CBL) of 20.1 mm when compressed to a flat position. The properties for the polymers are provided in Table 2 below.

TABLE 2

Properties for Fitment Polymers
S Table 5

| | Material | Description | Density (g/cm$^3$) | MI (g/10 min) | Elastic Recovery (%) | Tm (° C.) DSC |
|---|---|---|---|---|---|---|
| 1 | Infuse™ 9817 | Ethylene/octene Multi-block copolymer | 0.877 | 15 | 60-70 | 120 |
| 2 | DMDA 8920 | High density Polyethylene | 0.956 | 18 | <1 | 130 |

TABLE 2-continued

Properties for Fitment Polymers
S Table 5

| | Material | Description | Density (g/cm$^3$) | MI (g/10 min) | Elastic Recovery (%) | Tm (° C.) DSC |
|---|---|---|---|---|---|---|
| 3 | Versify ™ 4301 | Propylene Ethylene Random Copolymer | 0.870 | 25* | 0-20 | NA |

*MFR @ 2.16 Kg, 230° C.

3. Heat Seal Bars

Three sets (pairs) of heat sebars with the design of seal bars 20, 22 are produced with dimensions shown in Table 3.

TABLE 3

Heat seal bar dimensions

| | Set 1 | Set 2 | Set 3 |
|---|---|---|---|
| distance (x) (mm) | 0.8 | 0.8 | 0.8 |
| Recessed surface length (RSL) (mm) | 19 | 20 | 22 |
| Compressed Base Length CBL (mm) | 20.1 | 20.1 | 20.1 |
| Curved surface radius of curvature (Rc)(mm) | 0.8 | 0.8 | 0.8 |

4. Processing Conditions

Each fitment is placed between two opposing films of Film 1 (from Table 1), with seal layers facing each other.

Each fitment-film configuration is subjected to a one-step heat sealing process with conditions below.

Aluminum seal bars are assembled onto a Brugger HSG-C heat sealing apparatus.

The heat seal apparatus is set to 130° C. for initial testing. Five prototypes are heat sealed with each different set using a 1 second heat seal time. After sealing the fitments, the bottoms of the multilayer films are also sealed using a standard manual heat sealer (flat bar) with a width of 6 mm set for 1 second seal time (temperature is not controlled). The flexible containers (pouches) are tested by inflating them with air and capping them with a screw cap, immersing them in water and compressing them by hand looking for bubbles as sign of leakages. Any leakage is reported as failure. The fitments that passed showed a clear deformation of the base material at the edges forming the in situ winglets which caulk the gap between film and base, preventing leakages as shown in FIGS. 8-10.

TABLE 4

Processing conditions for installing the fitments
Heat seal process conditions

| | |
|---|---|
| Equipment: | Brugger HSG-C heat sealing apparatus |
| Description: | Opposing flat seal bars with independent temperature control and force distribution. |
| Seal force: | N |
| Heat seal bar dimensions: (upper and lower) | width: 10 mm length: 180 mm |
| Heat seal bar material: | Aluminum |
| Air Pressure: | 6 Bars |

TABLE 4-continued

Processing conditions for installing the fitments
Heat seal process conditions

| | |
|---|---|
| Upper seal bar temperature: | 130-150° C. +/− _° C. |
| Lower seal bar temperature: | 130-150° C. +/− _° C. |
| Seal time: | 0.5-2.5 seconds |

5. Seal Testing

A. Fitments made from DMDA 8920 and VERSIFY 4301 and subjected to the heat seal conditions in Table 4 failed to seal. The DMDA 8920 and VERSIFY 4301 fitments exhibit improperly sealed edges and severe leakage.

B. Fitments made with INFUSE™ 9817

Five runs are performed for each heat seal bar set: Set 1, Set 2, and Set 3 using fitments made from INFUSE™ 9817. The seal pass rate for the INFUSE™ 9817 fitments for each heat seal bar set is provided in Table 5.

TABLE 5

Pass/failure rate INFUSE ™ 9817 fitments

| | Set 1 | Set 2 | Set 3 |
|---|---|---|---|
| Recessed Surface Length | 19 mm | 20 mm | 22 mm |
| Pass/Runs | 5/5 | 1/5 | 0/5 |

A. For Set 1, all five runs yield sealed fitments. For Set 2, one run yields a sealed fitment. For Set 3, no runs yield a sealed fitment.

Bounded by no particular theory, it is believed that the 100% success rate for Set 1 is due to the compressed base length (20.1 mm) being greater than the recessed surface length (19 mm). This configuration enables the heat seal bar curved surfaces to impart a low stress pinching force upon the flattened base edges for the formation of strong in situ winglets.

B. A second test is performed with the 19 mm seal bar (Set 1) varying the seal time from 0.3 to 2.5 seconds with the results shown in Table 6.

TABLE 6

Pass/fail rate Set 1 (19 mm), INFUSE ™ 9817, and different seal times.

| Seal Time (s) | 0.3 | 0.5 | 1.0 | 1.5 | 2.0 | 2.5 |
|---|---|---|---|---|---|---|
| Result (pass/fail) | Fail | Pass | Pass | Pass | Pass | Pass |

No collapse of the base (welding of the internal walls to each other) is observed with extending the seal times (dwell times).

C. In a third test, the Set 1 heat seal temperature is increased to 150° C., with a dwell time of 1 second. The INFUSE™ 9817 fitment passes the seal test.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A process comprising:
   A. providing a fitment with a base having a wall thickness ($T_w$), the base comprising an ethylene/α-olefin multi-block copolymer;
   B. placing the base between two opposing multilayer films, each multilayer film having a respective seal layer comprising an olefin-based polymer;
   C. positioning the base and opposing multilayer films between opposing seal bars, each seal bar comprising
      (i) a front surface,
      (ii) a recessed surface a distance (x) behind the front surface, the recessed surface having a first end and an opposing second end, and
      (iii) a curved surface at each opposing end, the curved surface extending between the front surface and the recessed surface, each curved surface having a radius of curvature (Rc) greater than or equal to distance (x); and
   D. heat sealing the base to each multilayer film.

2. The process of claim 1 comprising providing seal bars fulfilling Formula (1) below $$x = \text{from } 0.8(T_w) \text{ to } 1.1(T_w) \quad \text{Formula (1).}$$

3. The process of claim 1 comprising:
   selecting, for the base, an ethylene/α-olefin multi-block copolymer with a melt temperature, Tm1, from 115° C. to 125° C.;
   selecting, for the seal layer of the multilayer films, an olefin-based polymer having a melting point, Tm2, wherein Tm2 is from 10° C. to 40° C. less than Tm1.

4. The process of claim 1 comprising heating, with the opposing seal bars, the base to a temperature to at least the softening point of the ethylene/α-olefin multi-block copolymer;
   compressing the base; and
   forming, with the heating and the compressing, a caulk, the caulk comprising a material selected from the group consisting of melted polyolefin from the seal layer, melted ethylene/α-olefin multi-block copolymer from the base, and combinations thereof.

5. The process of claim 4 wherein each recessed surface has a length, the process comprising compressing, between the heated seal bars, the base; and
   forming a compressed base having a compressed base length (CBL) that is greater than the recessed surface length.

6. The process of claim 5 wherein the compressed base has opposing flattened base ends, the process comprising
   pinching, with the opposing curved surfaces, the caulk at the flattened base ends; and
   forming in situ winglets.

7. The process of claim 1 comprising retracting the seal bars from the base; and
   allowing the base to recoil and form an elliptical cross-section shape.

8. The process of claim 1 wherein the heat sealing forms a welded base, the process comprising
   E. positioning the welded base between the opposing seal bars; and
   F. cold sealing the welded base.

9. The process of claim 1 wherein the heat sealing forms a welded base, the process comprising impulse sealing the welded base.

10. The process of claim 1 comprising forming a hermetic seal between the base and the multilayer films.

11. The process of claim 1 wherein the opposing multilayer films are superimposed on each other and form a common peripheral edge;
    sealing the multilayer films along the common peripheral edge; and
    forming a flexible container.

12. The process of claim 1 comprising providing a fitment with a base consisting of an ethylene/α-olefin multi-block copolymer.

13. The process of claim 1 comprising providing a fitment with a base having a wall thickness ($T_w$) from 0.2 mm to 2.0 mm.

14. The process of claim 1 wherein providing a fitment comprises injection molding a composition comprising the ethylene/α-olefin multi-block copolymer to form the fitment.

15. The process of claim 1 wherein the ethylene/α-olefin multi-block copolymer consists of (i) ethylene and (ii) a $C_4$-$C_8$ α-olefin comonomer.

* * * * *